Patented Jan. 14, 1947

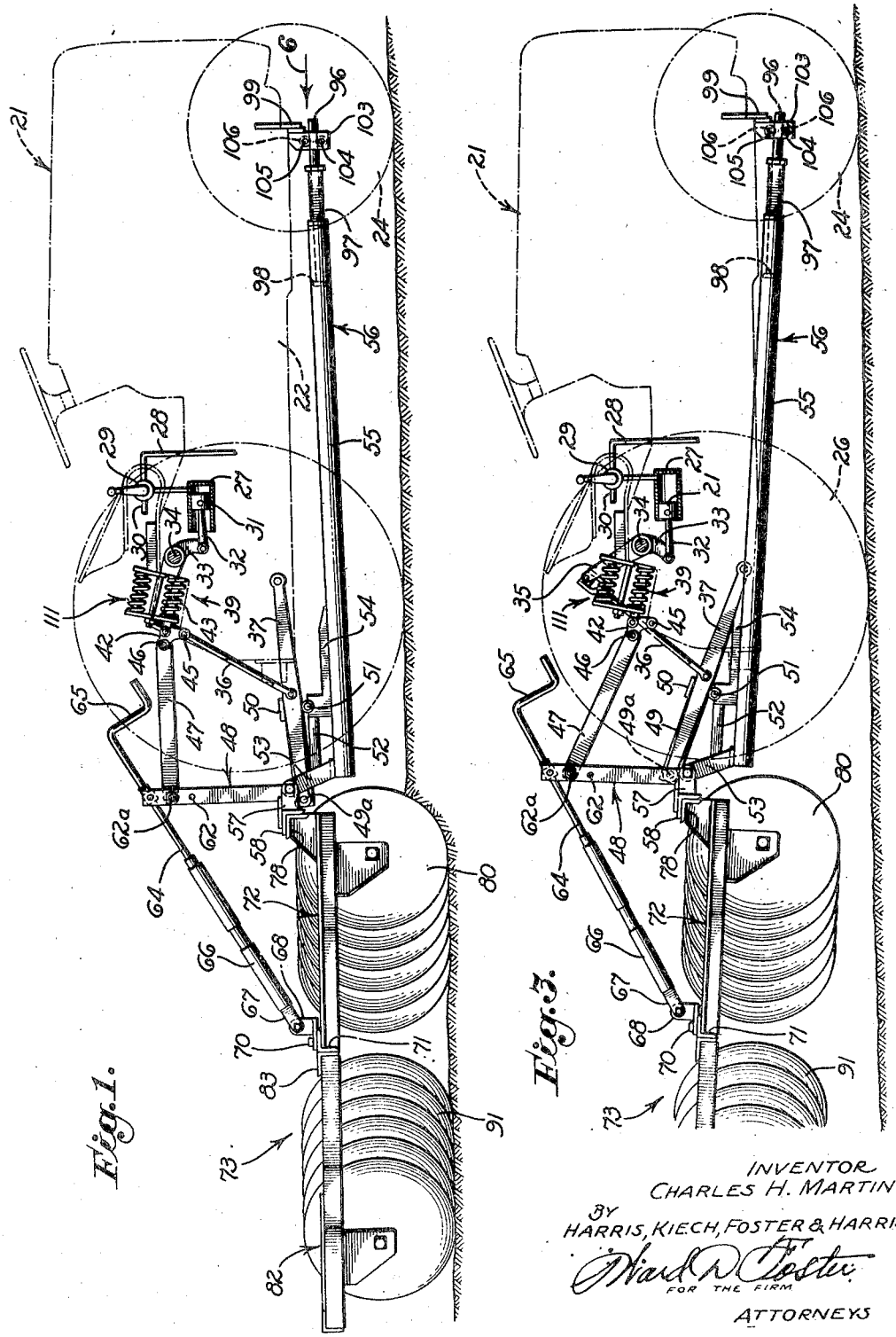

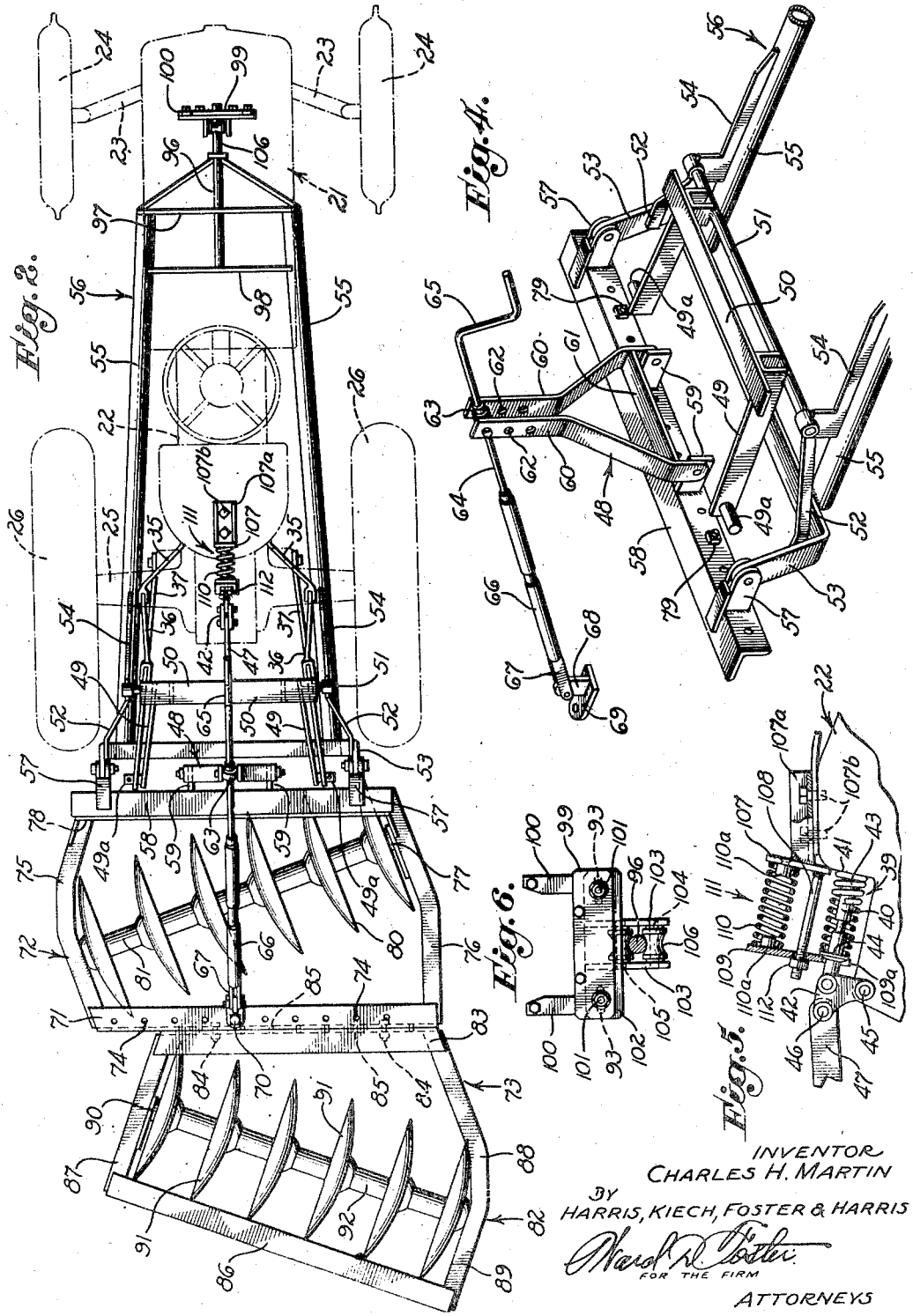

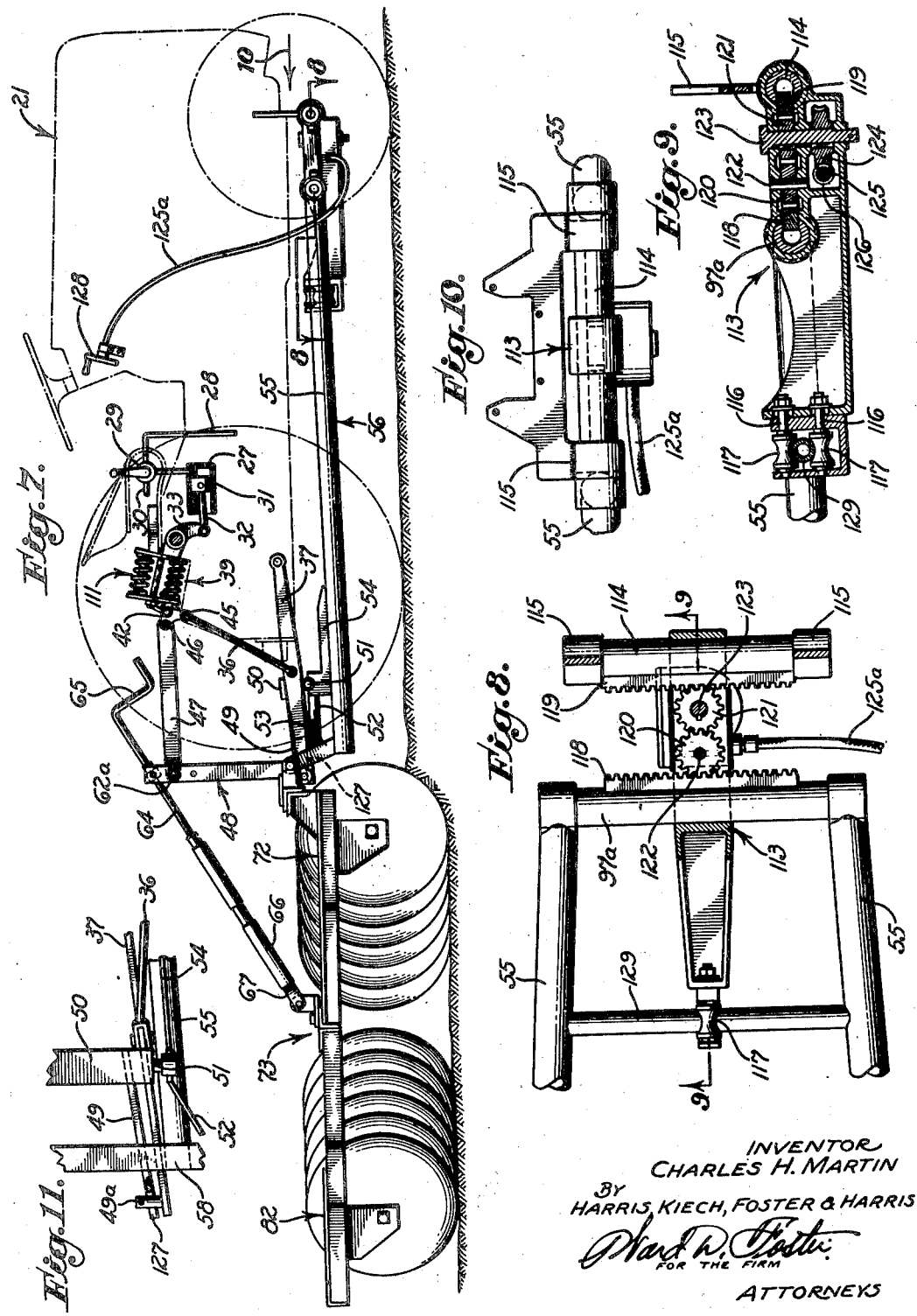

2,414,114

UNITED STATES PATENT OFFICE 2,414,114

TRACTOR-CONVEYED IMPLEMENT AND HITCH THEREFOR

Charles H. Martin, Huntington Park, Calif., assignor to Howard B. Rapp and Sally Rapp, copartners doing business as Towner Manufacturing Co., Santa Ana, Calif.

Application May 13, 1942, Serial No. 442,825

19 Claims. (Cl. 97—50)

My invention relates to a device conveyed by a tractive vehicle, and a hitch for connecting such device to such vehicle, and, since it finds particular utility embodied in an implement such as an offset disc harrow conveyed by a tractive vehicle, such as a tractor, the objects and advantages of my invention will be described in connection with such embodiment, it being understood that my invention is not restricted to an offset disc harrow or an implement or a hitch construction therefor adapted for connection to a tractor.

Control devices have been combined with tractors for the purpose of automatically controlling the depth of cut of an implement drawn by the tractor and for the purpose of elevating it for transportation in an inoperative position. Linkages have been provided for connecting such a tractor and such a control means to an implement, and such linkages have met with some success when applied to such implements as plows. However the problem of providing a satisfactory offset disc harrow and hitch for connecting it to such a tractor and such an automatic control means involves many problems not presented by an implement such as a plow and its connection to such a tractor and means.

An offset disc harrow should be made of substantial weight in order to insure penetration of its discs in the ground to the desired extent. The automatic control means and elevating means of those tractors most commonly used with the hitches heretofore employed provide insufficient force to properly control the depth of cut or to elevate to transporting position an offset disc harrow of the desired weight.

It is an object of my invention to provide an offset disc harrow and a hitch for connecting it to a tractor and to the control and elevating means thereon, which includes a linkage presenting the most favorable leverage whereby the minimum force is required for such means to control the depth of cut of the harrow and to move it to transporting position.

As the control and elevating means of the tractor lift the implement which the tractor conveys and which is trailing the tractor, there is of course an upwardly directed force exerted upon the tractor. If this force is directed upon the tractor adjacent the rear or driving wheels thereof, the traction of the tractor is diminished.

It is an object of my invention to provide an implement and a hitch mechanism for connecting it to a tractor and a control and elevating means thereon whereby the upward force directed upon the tractor by the implement during the lifting of the implement is reduced to a minimum value and applied where it diminishes to the least extent the traction of the tractor. More specifically, it is an object of my invention to provide such an implement and hitch mechanism which include a linkage presenting the most favorable leverage for the transmission of the upwardly directed force upon the tractor by the implement during the lifting of the implement whereby such force is reduced to a minimum and to apply this upwardly directed force at the maximum distance from the rear or traction wheels of the tractor so that the component of such force exerted upon the rear wheels is of minimum value.

When a disc harrow is operated offset from the tractive vehicle by which it is conveyed, side draft forces substantially at right angles to the longitudinal edge of the tractor are applied to the tractor, tending to cause it to turn in the direction in which the harrow is offset. These side draft forces are very substantial and, if exerted through the linkage ordinarily employed for connecting a tractor with an automatic control and an elevating means, render it extremely laborious, if not impossible, for the operator to convey the harrow in a straight line.

It is an object of my invention to provide a harrow and a hitch for connecting it to a tractor and its control and elevating means, in which such side draft forces exerted upon the tractor are reduced to their minimum and resisted by mechanism other than the linkage from the harrow to the depth control and elevating means.

Likewise, in the operation of a disc harrow in offset position there is a tendency for the harrow to rotate about its horizontal longitudinal axis and to apply to the linkage connecting the implement to the control and elevating means of the tractor, forces most substantial and destructive. The hitch mechanisms employed with such tractors and implements other than harrows are unable to overcome these forces, with the result that the harrow is not caused to penetrate the ground at the same depth at both of its ends.

It is an object of my invention to provide a disc harrow and a hitch mechanism for connecting it to a tractor and the control and elevating means thereon, which provide the most favorable leverage possible for the resistance of such forces, whereby the implement is caused to cut to a uniform depth without imposing destructive stresses upon the hitch mechanism or implement.

It is still another object of my invention to provide an implement of the class described and a hitch for connecting it to a tractor and its control and elevating mechanism by which the tendency of the harrow in offset operation to cause the tractor to turn from a straight path is overcome and, more specifically, to accomplish this purpose by varying the relative pressures of contact of the front wheels with the ground.

In offset disc harrows of conventional construction drawn by a tractor with control or elevating means, the frames of both the front and rear gangs of the harrow are at an angle with each other and at an angle other than 90° with the longitudinal axis of the tractor. As the degree of offset of the harrow on either side of this longitudinal axis is varied, the distance between the implement and the harrow is therefore likewise varied. If the variation of degree of offset of a harrow connected to a tractor and control and elevating mechanism thereon various the distance between the harrow and the implement, the force which must be exerted by the control and elevating means to maintain a desired depth of cut or to lift the harrow varies widely for different positions of offset of the harrow. To secure automatic and uniform control of the depth of cut of the harrow and uniform elevation of the harrow upon the application of uniform force by the elevating mechanism, numerous complicated adjustments of such mechanism would be necessary for each change in degree of offset of the harrow.

It is an object of my invention to provide an implement of the class described and a hitch for connecting it to a tractor and control and elevating mechanism thereon by which the degree of offset of the harrow may be varied on either side of the longitudinal axis of the tractor without varying the distance between the implement and the tractor parallel to such axis.

Still another object of my invention is the provision of such an implement and hitch by which the two gangs of the harrow may be easily and quickly shifted relative to each other.

Still another object of my invention is the provision of an offset disc harrow which operates to cut a furrow on both sides of the harrowed strip, whereby none of the harrowed earth is discharged upon the unharrowed ground.

Still another object of my invention is the provision of an offset disc harrow and a hitch for connecting it to a tractor and the control and elevating mechanism of the tractor, whereby the implement and hitch may be quickly and easily attached to and detached from the tractor and such mechanism.

Another object of my invention is the provision of an offset disc harrow and a hitch of the character described, which includes means for varying, either during travel of the harrow or when the harrow is stationary, the depth of cut of the discs of one gang relative to the depth of cut of the discs of the other gang to overcome the forces which would be exerted upon the tractor by the harrow in offset position if the discs of both gangs penetrated the ground to the same depth.

The automatic control and elevating means customarily employed on tractors with implements other than harrows are not required to lift weights comparable with the weight of an offset disc harrow. This is for the reason that such implements as plows have a tendency to ride out of the ground and elevate themselves. The rear gang of an offset disc harrow rigidly connected to the front gang overcomes this tendency of the front gang and comprises a dead weight much greater than, and located at a greater distance from the tractor than, the weight of implements such as plows. In order for the depth control means of tractors designed for operation with such implements as plows to operate efficiently conveying a disc harrow, it is necessary to modify such means to make allowance for the increase in such weight and moment.

It is accordingly an object of my invention to provide in an implement and hitch therefor means for modifying the depth control mechanism of a tractor to counteract the increase in weight to be elevated by such mechanism when an implement such as a plow is removed therefrom and a disc harrow is attached thereto.

Embodiments of my invention capable of performing these objects and providing these advantages and others are described in the following specification, which may be better understood by reference to the accompanying drawings in which:

Fig. 1 is a side elevational view of a harrow and hitch of my invention conveyed in operative position by a tractor;

Fig. 2 is a plan view of the harrow and hitch illustrated in Fig. 1;

Fig. 3 is a side elevational view of the same harrow and hitch with the harrow in its transporting position;

Fig. 4 is a fragmentary perspective view of a portion of the hitch of my invention;

Fig. 5 is an enlarged fragmentary elevational view, partially in section, of the means of my invention modifying the automatic depth control and lifting means of the tractor;

Fig. 6 is a front elevational view taken as indicated by the arrow 6 of Fig. 1;

Fig. 7 is a modified form of harrow and hitch of my invention in operative position;

Fig. 8 is a sectional view taken as indicated by the line 8—8 of Fig. 7;

Fig. 9 is a sectional view taken as indicated by the line 9—9 of Fig. 8;

Fig. 10 is a front elevational view taken as indicated by the arrow 10 of Fig. 7; and Fig. 11 is a plan view of a portion of the hitch illustrated in Fig. 7.

Referring to the drawings, which are for illustrative purposes only, and particularly to Figs. 1 to 4, the numeral 21 indicates a tractor, illustrated in broken lines. The tractor 21 includes a frame 22, a front axle 23 with front wheels 24 mounted thereon, and a rear axle 25 with traction wheels 26 mounted thereon and driven through suitable mechanism by the tractor engine.

The hitch and implement of my invention illustrated in these figures may be employed with automatic depth control and elevating mechanisms of various kinds. In the drawings I have illustrated a control and elevating mechanism such as disclosed in Patents No. 2,118,180 and No. 2,118,181 of H. G. Ferguson. This mechanism includes a cylinder 27 to which fluid under pressure is supplied through a line 28 from a source of supply, such as a pump driven by the engine. The flow of fluid through the line 28 is controlled by a manually actuated valve 29, which also controls the passage of fluid from the cylinder 27 through a pipe 30 to a suitable storage tank. Mounted for reciprocation in the cylinder 27 is a piston 31 connected by a piston rod 32 to one end of a lever 33 pivoted at 34 intermediate its ends. The lever 33 on the opposite side of the pivot 34 is bifurcated to provide two arms 35, each of which is pivoted to the upper end of a pull rod 36, the lower end of each rod being swingably mounted upon an elevator lever or link 37. Each of the links 37 is pivoted at its forward end to the frame 22 forwardly of the rear axle 25.

The numeral 39 indicates an automatic depth control mechanism which, as best illustrated in Fig. 5, includes a telescoping valve member 40 mounted for telescoping movement between a portion 41 of the frame 22 and a bell crank 42 to which one end of the valve member 40 is secured. A compression spring 43 is mounted around the valve member 40 with one end bearing against the frame portion 41 and the other end abutting a collar 44 mounted on the valve member 40. The spring 43 resists the collapsing movement of the valve member 40. One arm of the bell crank lever 42 is pivoted at 45 to the tractor 21, and the other arm is pivoted at 46 to one end of a link 47. The other end of the link 47 is pivotally secured to a yoke 48 adjacent its upper end.

When an implement of conventional construction and weight, for which the draft control mechanism 39 is designed, is secured to the lower end of the yoke 48 and the link 37, the valve member 40 operates to automatically provide fluid under pressure to the cylinder 27 when the draft force necessary to draw such an implement exceeds a predetermined value. This supply of fluid to the cylinder 27 rotates the arms 35 of the lever 33 forwardly, thus urging the rearward ends of the links 37 upwardly to lift the implement and diminish its resistance to forward movement, while at the same time imposing a portion of the weight of the implement upon the rearward end of the tractor 21 and increasing its traction.

The mechanism hereinbefore described and its operation are disclosed in the Ferguson patents hereinbefore referred to.

In accordance with my invention the rearward ends of the links 37 are not secured to an implement but are pivotally secured by pins 49a to return bars 49, which extend forwardly to adjacent the connection of the rods 36 to the links 37. The forward ends of the return bars 49 are secured between a crossbar 50 and a transverse shaft 51. Metal straps 52 are secured to the ends of the transverse shaft 51 and are connected at their rearward ends to a stirrup member 53. The ends of the transverse shaft 51 and the forward ends of the metal straps 52 are attached to bracket members 54, which are secured to longitudinal members 55 of a lever or sub-frame 56.

The rearward ends of the stirrups 53 are pivoted between lugs 57 carried by a front frame connection 58 in the form of an angle. The angle 58 is adapted for attachment to the transverse member of a front gang of a two-gang disc harrow in a manner which will be described.

Adjacent its center, the angle 58 is provided with forwardly extending lugs 59 to which the lower ends of arms 60 of the yoke 48 are pivoted. The yoke 48 includes the arms 60, which converge upwardly, and a transverse brace 61 extending between them adjacent the lugs 59. The arms 60 are provided with a plurality of aligned openings 62 for the reception of a bolt 62a to connect the link 47 to the yoke 48 at various levels.

Pivoted between the upper portion of the arms 60 is a bearing 63. A shaft 64 is rotatably mounted in the bearing 63, so that it is restrained against axial movement relative thereto. The shaft 64 is provided with a crank 65 at its upper end, and its lower end is threaded into a sleeve 66 connected to a bracket 67 pivoted to a lug 68. The lug 68 is mounted upon a plate 69 secured by a bolt 70 to a rear transverse member 71 of a front frame 72 of a drag device or trailing device in the form of a two-gang disc harrow 73. A plurality of openings 74 are provided along the rear transverse member 71, so that the plate 69 may be secured at a plurality of positions along this transverse member 71.

The front frame 72 includes end members 75 and 76 angled to provide parallel portions normal to a shaft 77 connected thereto. The shaft 77 is at the desired working angle with the path of travel of the implement. The end members 75 and 76 are connected by the rear transverse member 71 and a front transverse member 78.

The transverse member 78 is in the form of an angle and is adapted for nesting in the angle 58 previously described. The angles 58 and 78 are provided with a plurality of openings in their vertical legs for the reception of bolts 79, so that the front frame 72 may be secured to the angle 58 in numerous positions of offset or directly behind the tractor 21.

Mounted upon the shaft 77 for rotation thereon are a plurality of discs 80 separated by spacing spools 81.

Attached to the front frame 72 is a rear frame 82 which includes a front transverse member 83 in the form of an angle, the vertical leg of which is adapted for being clamped to the vertical leg of the rear transverse member 71 of the front frame 72 by bolts 84 passing therethrough. A plurality of openings 85 for the bolts 84 are provided in the legs of both the transverse members 71 and 83, so that the rear frame 82 may be moved transversely to any desired position relative to the front frame 72 and secured thereto. The rear frame 82 includes also a rear transverse member 86 in the form of an angle and end members 87 and 88.

The end member 87 is secured to the rear transverse member 86 at right angle thereto and to the front transverse member 83 at an obtuse angle, the end member 88 connecting the opposite ends of these transverse members and being provided with a portion 89 at right angle to the rear transverse member 86. Connecting the portion 89 of the end member 88 and the end member 87 is a shaft 90 upon which are rotatably mounted a plurality of discs 91 held in their proper spaced relationship by spools 92. The shaft 90, like the shaft 77, makes an angle equal to the desired working angle with the transverse members 83, 71, and 78. A suitable working angle may be of the order of 20°.

The lower ends of the longitudinal members 55 of the subframe 56 are attached to the stirrup member 53 and extend forwardly to adjacent the front axle 23 where they are connected by a transverse bar 97. A transverse brace 98 connects the longitudinal members 55 near their forward ends and a cylindrical pin 96 attached to the brace 98 at its center extends through the transverse bar 97 and forwardly of a plate 99 attached by arms 100 to the frame 22 of the tractor 21. The plate 99 is attached by bolts 101 to a rearward plate 102 having transversely elongated openings 93 for the reception of the bolts 101 to permit the transverse adjustment of the plates 99 and 102.

Secured to the rearward plate 102 are depending lugs 103 connected by pins 104 and 105 upon each of which there is mounted a roller 106 of hourglass form. The rollers 106 are spaced to receive between them the pin 96 to restrain motion of the pin 96 and the forward part of the subframe 56 transversely relative to the tractor frame 22, while permitting the subframe 56 to move longitudinally relative to the frame 22.

The spring 43 of the automatic depth control mechanism 39 customarily employed upon such tractors is made of such resistance to deformation as to be compressed sufficiently to automatically lift the attached implement. This automatic lifting of such a conventional implement results from the increased resistance to forward motion of the implement, urging the link 47 forwardly, compressing the spring 43, and telescoping the valve member 40 to supply fluid under pressure to the cylinder 27 and thus through the lever 33 and rods 36, lifting the links 37 and attached implement upwardly.

In the event that the weight of the implement attached to the tractor 21 and the automatic depth control mechanism 39, or the moment of such implement exerted upon the depth control mechanism is greater than the weight or such moment of the conventional implement for which the depth control mechanism is designed, it is necessary to apply a compensating force to the spring 43 although the implement offers a resistance to forward motion substantially equal to the resistance to forward motion of such a conventional implement penetrating the soil to the same depth. Likewise, in the event that there is attached to the tractor 21 and the depth control mechanism 39 an implement of substantially the same weight as such a conventional implement, but which, due to its type of construction or means of attachment to the tractor or depth control mechanism, offers less resistance to forward motion when penetrating the soil to the desired maximum depth than such an instrument of conventional construction, it is necessary to apply a compensating force to the spring 43. This compensating force is of such value that the spring 43, under these varying conditions, will permit movement of the telescoping valve member 40 to automatically control the depth in the same manner as when such a conventional implement is employed.

Due to the fact that the harrow 73 is of considerably greater weight than such a conventional implement for which the depth control mechanism 39 is designed, it is necessary to compensate the spring 43 by compressing it an amount which is a function of such difference in weight. The automatic depth control mechanism thus far described is provided with a compensating mechanism 111 adapted for compensating the spring 43 when there is attached to the depth control mechanism an implement of greater weight or one offering less resistance to forward motion than such a conventional implement.

This mechanism 111 includes a plate 107 having formed thereon a bracket 107a secured to the tractor 21 by bolts 107b. The plate 107 has mounted thereon a pivot pin 108 projecting rearwardly therefrom substantially parallel to and above the valve member 40. A plate 109 is loosely mounted upon the pin 108 and is provided with legs 109a projecting around the valve member 40 in contact with the rearward side of the collar 44. The legs 109a are urged forwardly, and the uper end of the plate 109 is urged rearwardly by an auxiliary pressure means in the form of a compression spring 110 retained in place between the plates 107 and 109 by an inwardly extending projection or boss 110a provided upon each of them. A nut 112 is threaded upon the pivot pin 108 against the plate 109, so that the plate 109 is caused to compress the spring 43 sufficiently to compensate for the increased weight of the harrow 73 over the weight of the conventional implement for which the depth control mechanism 39 is designed. While the compensating mechanism of my invention has been described with specific reference to a disc harrow attached to the tractor and the automatic depth control mechanism of the tractor, it will be understood that this compensating mechanism may with equal advantage be employed in connection with any pulling device having thereon an automatic depth control or lifting mechanism and in connection with any trailing device which is of greater weight than, or exerts upon the automatic depth control or lifting mechanism a moment greater than, the weight or moment of the trailing device for which the control or lifting mechanism is designed or any trailing device which, although of approximately the same weight and exerting approximately the same moment upon the control or lifting mechanism as the trailing device for which such control or lifting mechanism was designed, offers less resistance to forward motion than the device for which the control or lifting mechanism was designed.

The harrow being in the operative position illustrated in Fig. 1, draft force is applied to the harrow through the transverse shaft 51, straps 52, stirrup member 53, bracket member 54, subframe 56, and lugs 57, which may be regarded as draft means. When this draft force necessary to propel the harrow increases as the harrow passes over softer ground, the links 37 swing upwardly and through the yoke 48 and the link 47 moves the valve member 40 to a more collapsed position, thus supplying fluid under pressure to the piston 27. This fluid forces the piston 31 outwardly, swinging the arms 35 of the lever 33 forwardly and pulling the rods 36 and the links 37 upwardly, the lever 33, rods 36, and links 37 and 47 constituting an elevating linkage, and the return bars 49, crossbar 50. transverse shaft 51, straps 52, stirrup members 53, and lugs 57 constituting a first linkage, and the yoke 48, bearing 63, shaft 64, sleeve 66. and bracket 67 constituting a second linkage, the two linkages together constituting a linkage connecting the implement to the power lift mechanism so that the implement may be drawn by the tractive vehicle and lifted by the power lift mechanism. The upward movement of the links 37 causes the harrow to be elevated to penetrate the ground to a lesser depth, thus reducing the draft pull necessary to propel it to that predetermined value determined by the resistance of the spring 43 opposed by the spring 110 to the collapsing of the valve member 40. The lifting of the implement imposes upon the tractor 21 a part of the weight of the implement, increasing the pressure of the rear wheels 26 against the ground and thus increasing the traction of the tractor.

When harder ground is encountered and the draft pull necessary to propel the tractor has diminished below the predetermined value for which the springs 43 and 110 are set, the spring 43 urges the plate 109 rearwardly, moving the valve member 40 to extended position and permitting the harrow to be lowered by gravity relative to the tractor to penetrate the ground to a greater depth.

The front frame 72 and the rear frame 82 of the harrow 73 being rigidly connected together and the front frame 72 being lifted and lowered substantially vertically by this automatic depth control operation, the two frames 72 and 82 are maintained in substantially the same plane through the elevation and lowering.

When it is desired to elevate the disc harrow 73 from its operative position illustrated in Fig. 1 to its transporting position illustrated in Fig. 3, the control lever 29 is actuated by the operator from his place on the tractor to cause fluid under pressure to be admitted to the line 28 and cylinder 27, moving the piston 31 outwardly and swinging the arms 35 of the lever 33 forwardly. This exerts tension on the rods 36 and causes the links 37, crossbar 50, and transverse bar 51 to swing upwardly.

The front frame 72, being connected to the transverse shaft 51, and through the yoke 48 and link 47 to the tractor, is thus moved upwardly, and the rear frame 73, being rigidly connected to the front frame 72, is likewise elevated so that the discs 80 and 91 of the two frames remain in substantially the same plane. When it is desired to lower the disc harrow 73 to its operative position, it is necessary only for the operator to manipulate the control lever 29 so that the fluid under pressure in the cylinder 27 is permitted to flow through the outlet line 30 to the storage tank of the system, whereupon the weight of the disc harrow 73 causes it to descend to a depth of ground penetration predetermined by the setting of the automatic depth control mechanism 39.

If at any chosen depth of penetration or degree of offset of the disc harrow 73 relative to the longitudinal axis of the tractor 21 the operator finds that the harrow is exerting any side draft or transverse forces upon the tractor, they are readily overcome by his manipulation of the crank 65 operating connecting means which includes the yoke 48, bearing 63, shaft 64, sleeve 66, and bracket 67. Thus, when the disc harrow 73 is offset to the right of the tractor 21, looking in the direction of travel, if there is any tendency for the side draft or transverse forces of the harrow upon the tractor to cause the tractor to veer to the right, this tendency may be overcome by rotation of the crank 65 in such direction as to lengthen the distance between the lug 68 and the yoke 48 to thus permit the rear gang to penetrate the ground to a greater depth. Such deeper penetration increases the side draft or transverse forces applied by the disc harrow 73 to the tractor 21, tending to cause it to veer to the left, resulting in an equilibrium of such forces, permitting the tractor to follow a perfectly straight course without special attention from the operator.

Such side draft or transverse forces may be overcome also by adjusting the relative positions of the plates 99 and 102 to move the point of attachment of the subframe 56 transversely on the tractor 21. This is accomplished by loosening the bolts 101 and moving the plate 102 laterally and securing it in its desired position by the bolts 101. Thus, if the side draft or transverse forces exerted by the harrow in offset position upon the tractor tend to cause the tractor to veer to the right, the rearward plate 102 is moved to the right of its central position. This causes the upward force exerted by the pin 96 upon the tractor 21 to be exerted to greater extent upon the right front wheel than upon the left front wheel, thus overcoming the tendency of the harrow to turn to the right. Such an upward force is directed by the pin 96 as a result of the tendency of the weight of the harrow 73 to rotate the forward end of the subframe 56 upwardly whenever any of the weight of the harrow is supported by the tractor. By such a transverse movement of the point of application of this upwardly directed force, the side draft or transverse forces resulting from the operation of the harrow in any degree of offset can be completely overcome by the manipulation of the crank 65, as previously described, while securing any desired depth of penetration of the discs.

Inasmuch as the return bars 49, crossbar 50, and transverse shaft 51 cause the weight of the harrow 73 to be applied to the links 37 immediately adjacent the connection of the links 37 to the rods 36, instead of at the ends of the links 37 which are at a distance from such points of connection substantially equal to the distance between such points and the pivoted ends of the links 37 and cause the transverse frame members 78 and 83 always to remain at right angles to the longitudinal axis of the tractor, thus permitting the center of gravity of the harrow 73 to be as close as possible to the tractor, it will be seen that the implement and hitch of my invention provide a linkage by which an implement of the maximum weight may be lifted with the application of the minimum force through the rods 36. Such features permit an implement, such as the disc harrow 73, to be elevated either to vary its depth of cut or to transport it in inoperative position with the minimum power from the elevating mechanism.

Whenever any of the weight of the harrow 73 is carried by the tractor 21, an upwardly directed force is exerted upon the tractor, since the harrow 73 is suspended behind the tractor. This upwardly directed force is applied by the pin 96 at a point substantially in alignment with the front axle 23. The application of this force at such point provides a lever arm of maximum length, since this point is spaced as far forwardly as possible from the points of connection of the rods 36 to the links 37. The implement and hitch of my invention therefore apply the upwardly directed force resulting from the lifting of the implement with the greatest possible mechanical advantage, so that such force is of the minimum value.

This upwardly directed force, if applied adjacent to the rear wheels of the tractor would have a component or moment tending to lift the rear wheels of the tractor and impair the traction of the tractor.

From the foregoing it will be seen that the implement and hitch of my invention reduce to a minimum the component of such upwardly directed force which is applied to the rear wheels, impairing their traction, by exerting this force as near as possible to the front wheels of the tractor.

The side draft forces applied to the tractor by the harrow in operation are applied to the links 37 and rods 36 adjacent their connection with each other instead of at the ends of the links 37, so that the moment of these forces tending to cause the front wheels to change their direction of travel is greatly reduced. Further, these side draft forces are resisted by the rigid subframe 56 reinforced against deformation.

Since the forces applied to the tractor, resulting from the tendency of the harrow in operation to rotate about its longitudinal axis, are applied through the long subframe 56 instead of through the much shorter lengths of the depth control and elevating mechanism, it will be seen that my invention reduces the effect of such forces upon the tractor to a minimum.

When it is desired to move the harrow 73 to offset position, it is necessary only to remove the bolts 79 and move the front frame 72 laterally relative to the angle 58 and again connect them by the bolts 79 and in a similar manner shift the connection of the plate 69 to the rear transverse member 71 of the front frame 72. Because the front transverse members 78 and 83 of the frames 72 and 82 are at all times at right angles to the longitudinal axis of the tractor 21, the movement of the harrow 73 to a position of any degree of offset and movement of the frames relative to each other do not change the distance between the center of gravity of the harrow 73 and the control mechanism of the tractor 21, so that the force required to elevate the implement to vary its depth of cut or to move it to transporting position remains constant for all of its positions of offset and all of the relative positions of the two gangs.

When it is desired to disconnect the implement and hitch of my invention from the tractor, it is necessary to remove the pins 49a from the links 37 and to remove the bolt connecting the link 47 to the yoke 48, whereupon the tractor may be driven forwardly until the pin 96 is moved out of contact with the rollers 106. It will be apparent that the implement and hitch of my invention may be again attached to the tractor 21 with equal facility. The compression of the spring 43 by the plate 109 due to the action of the spring 110 counteracts the effect upon the action of the spring 43 resulting from the excess of the weight of the harrow 73 over the lighter implement customarily employed with the depth control mechanism 39, so that it operates with this greater weight in the same manner that it operated with the lesser weight.

In Figs. 7 to 11, inclusive, which illustrate another embodiment of implement and hitch of my invention, also capable of performing the objects and providing the advantages hereinbefore set forth, like numbers are employed to indicate elements like those illustrated in Figs. 1 to 6 and previously described.

In this embodiment of my invention draft force is applied to the disc harrow 73 at the front end of the subframe 56 instead of through the return bars 49, the subframe 56, bracket members 54, stirrup member 53, straps 52, transverse shaft 51, and lugs 57 acting as draft means. The transverse bar 97a passes through a housing 113 through which a transverse member 114 also extends with its ends connected by hangers 115 to the frame 22 of the tractor 21. The housing 113 extends rearwardly of the transverse member 97a and is provided with rearwardly extending shafts 116. A roller 117 is secured upon each of the shafts 116 for rotation relative thereto. The rollers 117 are hourglass in form and spaced to receive between them a transverse brace 129 which is connected to the longitudinal members 55 of the subframe 56.

The transverse bar 97a is provided with a rack 118 which projects forwardly therefrom. A similar rack 119 is provided on the transverse member 114 and projects rearwardly therefrom.

Gears 120 and 121 are disposed within the housing 113 and mesh with the racks 118 and 119, respectively, and with each other. The gear 120 is rotatably mounted upon a pin 122 which is secured in the housing 113. The gear 121 is non-rotatably mounted upon a shaft 123 which has secured thereto a driving gear 124. A worm gear 126 is mounted upon a shaft 125 in the housing 113 for rotation by a flexible shaft connected thereto and extending through a flexible conduit 125a to a hand wheel 128 mounted upon the tractor 21 within reach of the driver.

With the construction described the driver of the tractor may by rotation of the hand wheel 128 rotate the worm gear 126, thus driving the driving gear 124 and causing the shaft 123 to rotate. The rotation of the shaft 123 causes the meshing gears 120 and 121 to rotate in opposite directions, and these gears, meshing with the racks 118 and 119, travel along the racks in the same direction and at the same rate of speed. As the housing moves transversely of the tractor 21 the rollers 117 roll along the transverse brace 129, retaining the housing 113 parallel to the longitudinal axis of the tractor 21 during its travel. In this manner the driver of the tractor may, during travel of the tractor, alter the point at which forces are applied by the subframe 56 to the tractor.

Whenever the disc harrow 73 is moved vertically relative to the tractor 21 in the embodiment of my invention illustrated in Figs. 1 to 6, there is longitudinal movement of the subframe 56 causing the pin 96 to move longitudinally upon the rollers 106. In the embodiment of my invention illustrated in Figs. 7 to 11, however, the forward end of the subframe 56 is restrained against longitudinal movement relative to the tractor 21.

In this form of my invention horizontal movement of the harrow during its vertical movement relative to the tractor 21 is permitted by providing an elongated opening 127 in each of the return bars 49 for the reception of the pin 49a connecting it to the link 37. The movement of the pins 49a in the elongated slots 127 permits a relative horizontal movement of the links 37 together with the tractor 21, to which they are connected, and the return bars 49 together with the subframe 56 to which they are connected.

While the harrow illustrated and described as an illustrative embodiment of my invention is a two-gang disc harrow, it will be apparent that my invention may with equal facility be applied to and employed with a multiple-gang disc harrow.

While those embodiments of my invention hereinbefore illustrated and described are fully capable of performing the objects and providing the advantages hereinbefore stated, there are various other embodiments likewise capable of performing these objects and providing these advantages, and I therefore wish my invention to be understood as not restricted to the specific embodiments hereinbefore described.

I claim as my invention:

1. Means for hitching a trailing device to a pulling device, which includes: draft means for coupling the two devices together; and means manually operable by the driver of the pulling device during travel of such devices and adapted for varying the elevation of the rearward end of the trailing device relative to its forward end and the pulling device.

2. In a hitch for connecting a trailing device having forward and rearward ground-engaging members to a tractive device, the combination of:

draft means for coupling the two devices together; connecting means variable in length connecting the trailing device to the tractive device and adapted on variation in length for varying the relative pressures of contact with the ground of the forward and rearward ground engaging members; and means operable by the driver of the tractive device during travel of the devices and adapted for varying the length of said connecting means.

3. In a hitch for connecting a disc harrow including a front gang of discs and a rear gang of discs to a tractor provided with an elevating linkage for lifting the harrow, the combination of: draft means connecting the harrow to the linkage, whereby the harrow is drawn in operative position; connecting means connected to the linkage and to the harrow at a point spaced from the connection of said draft means to the harrow, said connecting means including a member adapted for movement relative to said draft means, whereby the rear gang may be moved vertically relative to the front gang; and means for moving said member, whereby the relative values of the side draft forces of the front and rear gangs are varied.

4. In a hitch for connecting an implement to a tractor having a power lift mechanism for lifting the implement, the combination of: a linkage connecting the implement and mechanism, whereby the implement is drawn by the tractor and lifted by the mechanism; a lever rigidly connected to a part of said linkage and extending forwardly therefrom; and means connecting said lever to the tractor, whereby the weight of the forward portion of the tractor is applied in opposition to the lifted weight of the implement.

5. In a hitch for connecting an implement to a tractor having a power lift mechanism for lifting the implement, the combination of: a linkage connecting the implement and mechanism, whereby the implement is drawn by the tractor and lifted by the mechanism; a lever rigidly connected to a part of said linkage and extending forwardly therefrom; and means connecting said lever to the tractor, whereby the weight of the forward portion of the tractor is applied in opposition to the lifted weight of the implement, said means being adjustable for moving such connection transversely of the tractor.

6. In a hitch for connecting an implement to a tractor having a power lift mechanism for lifting the implement, the combination of: a linkage connecting the implement and mechanism, whereby the implement is drawn by the tractor and lifted by the mechanism; a lever rigidly connected to a part of said linkage and extending forwardly therefrom; means connecting said lever to the tractor, whereby the weight of the forward portion of the tractor is applied in opposition to the lifted weight of the implement; and means operable by the driver of the tractor and associated with said connecting means and adapted for affecting the direction of travel of the tractor by moving said connecting means transversely of the tractor.

7. In a hitch for connecting an implement to a tractor having a power lift mechanism for lifting the implement, the combination of: a linkage connecting the implement and mechanism, whereby the implement is drawn by the tractor and lifted by the mechanism; a lever rigidly connected to a part of said linkage and extending forwardly therefrom; and means so connecting said lever to the tractor as to restrain said lever against transverse movement while permitting its longitudinal movement relative to the tractor, whereby the weight of the forward portion of the tractor is applied in opposition to the lifted weight of the implement.

8. In a hitch for connecting an implement to a tractor having a power lift mechanism actuating elevator levers for lifting the implement, the combination of: a linkage connecting the elevator levers to the implement adjacent its sides, whereby the implement may be drawn by the tractor and elevated by the lift mechanism; a rigid frame including two longitudinal members rigidly connected to said linkage and extending forwardly therefrom; and means connecting said frame to the tractor, whereby the weight of the forward portion of the tractor is applied in opposition to the lifted weight of the implement.

9. In a hitch for connecting an implement to a tractor having elevator levers pivoted to the tractor and pull rods connected to such levers and a power lift mechanism for lifting the implement, the combination of: a first linkage connecting the elevator levers adjacent their connection to the pull rods to the implement; and means connecting the tractor to the implement including a second linkage connected to the implement rearwardly of its connection to said first linkage.

10. In an offset disc harrow and hitch for connection to a tractor having a power lift mechanism connected to elevator levers for lifting the harrow and an automatic depth control lever responsive to variations in draft for actuating such mechanism, the combination of: a rear gang of discs; a front gang of discs; means connecting said gangs rigidly together; a first linkage connecting the forward portion of said front gang to said elevator levers adjacent their connection to the lift mechanism; means connecting the tractor to said gangs including a second linkage connected to said gangs rearwardly of the connection of said first linkage; and means operable independently of the lift mechanism for varying the relative depth of cut of the discs of the said gangs by varying the effective length of said second linkage.

11. In an offset disc harrow and hitch for connection to a tractor having a power lift mechanism connected to elevator levers for lifting the harrow and an automatic depth control lever responsive to variations in draft for actuating such mechanism, the combination of: a rear gang of discs; a front gang of discs; means connecting said gangs rigidly together; a first linkage connecting the forward portion of said front gang to said elevator levers adjacent their connection to the lift mechanism; means connecting the tractor to said gangs including a second linkage connected to said gangs rearwardly of the connection of said first linkage; means operable independently of the lift mechanism for varying the relative depth of cut of the discs of the said gangs by varying the effective length of said second linkage; a lever connected to said first linkage and extending forwardly therefrom; and means connecting said lever to the tractor near its forward end, whereby the weight of the forward portion of the tractor resists the moment on the tractor of the lifted weight of the implement.

12. In an offset disc harrow and hitch for connection to a tractor having a power lift mechanism connected to elevator levers for lifting the harrow and an automatic depth control lever responsive to variations in draft for actuating such mechanism, the combination of: a rear gang of discs; a front gang of discs; means connecting said gangs rigidly together; a first linkage connecting the forward portion of said front gang to said elevator levers adjacent their connection to the lift mechanism; means connecting the tractor to said gangs including a second linkage connected to said gangs rearwardly of the connection of said first linkage; means operable independently of the lift mechanism for varying the relative depth of cut of the discs of the said gangs by varying the effective length of said second linkage; a lever connected to said first linkage and extending forwardly therefrom; means connecting said lever to the tractor near its forward end, whereby the weight of the forward portion of the tractor resists the moment on the tractor of the lifted weight of the implement; and means for affecting the path of travel of the tractor by shifting said lever connecting means transversely of the tractor.

13. In an offset disc harrow and hitch for connection to a tractor having a power lift mechanism connected to elevator levers for lifting the harrow and an automatic depth control lever responsive to variations in draft for actuating such mechanism, the combination of: a front frame; a rear frame; a gang of discs so mounted in each of said frames that the front of each frame and the rear of said front frame are at right angles to the path of travel of the tractor; a first linkage connecting the forward portion of said front gang to said elevator levers adjacent their connection to the lift mechanism; and means connecting the tractor to said gangs including a second linkage connected to said gangs rearwardly of the connection of said first linkage.

14. Means for hitching a trailing drag device to a pulling device whereby the drag device may be pulled by the pulling device, which includes: draft means for coupling the two devices together; and means operably connected to the drag device and to the pulling device and operable by the driver of the pulling device for varying the elevation of the rearward end of the drag device relative to its forward end and the pulling device.

15. Means for hitching a trailing device to a pulling device, which includes: draft means coupling the two devices together; means controllable by the operator of the pulling device during travel for swinging the trailing device about a first axis, whereby the trailing device is moved substantially vertically relative to the pulling device; and means operable by the operator of the pulling device during travel for swinging the trailing device about a second axis spaced from said first axis, whereby the elevation of the rearward end of the trailing device is varied relative to its forward end.

16. In an implement and hitch for connection to a tractor and a power lift mechanism connected to elevator levers for lifting the implement and an automatic depth control lever responsive to variations in draft for actuating such mechanism, the combination of: a front frame; a rear frame; ground-engaging members mounted in each of said frames, said frames being so formed that the front of each frame and the rear of said front frame are at right angles to the path of travel of the tractor; a first linkage connecting the forward portion of said front frame to said elevator levers adjacent their connection to the lift mechanism; and means connecting the tractor to said frames including a second linkage connected to said frames rearwardly of the connection of said first linkage.

17. A combination as in claim 1 including: means for lifting both the rearward end of the draft means and the trailing device.

18. A combination to be used with a tractor having an elevating linkage and comprising: an implement adapted to be drawn by the tractor and having forward and rearward ground-engaging members, said implement tending to produce side draft when drawn by said tractor in certain positions; draft means movably connected with said implement and adapted to be connected with said tractor for drawing said implement, and with said elevating means for lifting the implement; connecting means directly connected with the implement and adapted for connection with said elevating means, whereby the rearward ground-engaging members may be moved vertically relative to the forward ground-engaging members to equalize draft; and actuating means for said connecting means to produce said relative movement.

19. A combination according to claim 18 wherein said connecting means is constructed for variation in effective length, said actuating means including means operable independently of the operation of the elevating means for varying said effective length.

CHARLES H. MARTIN.